(12) United States Patent
Iacono et al.

(10) Patent No.: US 7,324,817 B2
(45) Date of Patent: Jan. 29, 2008

(54) WIRELESS COMMUNICATION METHOD AND APPARATUS FOR SELECTING AND RESELECTING CELLS BASED ON MEASUREMENTS PERFORMED USING DIRECTIONAL BEAMS AND AN OMNI-DIRECTIONAL BEAM PATTERN

(75) Inventors: Ana Lucia Iacono, Garden City, NY (US); Janet Stern-Berkowitz, Little Neck, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 521 days.

(21) Appl. No.: 11/026,292

(22) Filed: Dec. 30, 2004

(65) Prior Publication Data

US 2005/0176468 A1    Aug. 11, 2005

Related U.S. Application Data

(60) Provisional application No. 60/543,090, filed on Feb. 7, 2004.

(51) Int. Cl.
*H04Q 7/20* (2006.01)

(52) U.S. Cl. .................. 455/435.1; 455/63.4; 455/464; 455/525; 342/354; 342/367

(58) Field of Classification Search .................. 455/62, 455/63.4, 101, 269, 433, 435.1, 450, 464, 455/550.1, 525, 562.1, 575.7, 277.1–278.1; 342/81, 154, 354, 367, 368; 343/757, 777, 343/824
See application file for complete search history.

(56) References Cited

U.S. PATENT DOCUMENTS 3,846,799 A    11/1974   Gueguen ..................... 343/833

(Continued)

FOREIGN PATENT DOCUMENTS

EP    0987838    3/2000

(Continued)

OTHER PUBLICATIONS

Ohira et al., Electronically Steerable Passive Array Radiator Antennas for Low-Cost Analog Adaptive Beamforming, 0-7803-6345-0/00, 2000, IEEE.

(Continued)

*Primary Examiner*—William Trost
*Assistant Examiner*—James D Ewart
(74) *Attorney, Agent, or Firm*—Allen, Dyer, Doppelt, Milbrath & Gilchrist, P.A.

(57) ABSTRACT

A wireless communication method and apparatus for selecting and reselecting cells used by a wireless transmit/receive unit (WTRU) in a wireless multi-cell communication system. The WTRU includes a switched beam antenna configured to form a plurality of directional beams and an omni-directional beam pattern. The WTRU measures signals from a plurality of cells using the directional beams and the omni-directional beam pattern. The WTRU selects and registers with the cell having the strongest signal. In one embodiment, the WTRU selects a directional beam which has the strongest signal and uses it as an active beam to communicate with the selected cell. In another embodiment, the WTRU selects a cell/beam combination and registers with the selected cell using the selected beam. In yet another embodiment, the WTRU initiates a handoff to a neighboring cell that has a better signal measurement result than the selected cell.

14 Claims, 6 Drawing Sheets

U.S. PATENT DOCUMENTS

| | | | |
|---|---|---|---|
| 4,236,158 A | 11/1980 | Daniel | 343/100 |
| 5,905,473 A | 5/1999 | Taenzer | 343/834 |
| 5,966,384 A * | 10/1999 | Felix et al. | 370/465 |
| 6,038,448 A | 3/2000 | Chheda et al. | 455/436 |
| 6,229,486 B1 | 5/2001 | Krile | 343/700 MS |
| 6,304,215 B1 | 10/2001 | Proctor, Jr. et al. | 342/372 |
| 6,370,369 B1 * | 4/2002 | Kraiem et al. | 455/277.1 |
| 6,404,386 B1 | 6/2002 | Proctor, Jr. et al. | 342/368 |
| 6,456,257 B1 | 9/2002 | Zamat | 343/876 |
| 6,456,604 B1 * | 9/2002 | Lee et al. | 370/328 |
| 6,515,635 B2 | 2/2003 | Chiang et al. | 343/834 |
| 6,600,456 B2 | 7/2003 | Gothard et al. | 343/834 |
| 6,697,610 B1 * | 2/2004 | Tait | 455/277.1 |
| 6,697,642 B1 | 2/2004 | Thomas | 455/562.1 |
| 6,725,062 B1 * | 4/2004 | Paranchych | 455/561 |
| 6,771,622 B1 | 8/2004 | Banerjee | 370/331 |
| 6,834,190 B1 * | 12/2004 | Lee et al. | 455/436 |
| 7,065,373 B2 | 6/2006 | Rodgers et al. | 455/502 |
| 7,136,483 B2 * | 11/2006 | Khaleghi et al. | 379/448 |
| 2001/0024431 A1 * | 9/2001 | Koo et al. | 370/335 |
| 2002/0071403 A1 | 6/2002 | Crowe et al. | 370/331 |
| 2002/0137538 A1 | 9/2002 | Chen et al. | 455/550 |
| 2003/0114172 A1 | 6/2003 | Soliman | 455/456 |
| 2003/0222818 A1 | 12/2003 | Regnier et al. | 342/383 |
| 2003/0228857 A1 | 12/2003 | Maeki | 455/278.1 |
| 2004/0023634 A1 | 2/2004 | Jeong et al. | 455/403 |
| 2004/0029534 A1 | 2/2004 | Odenwalder | 455/67.11 |
| 2004/0116110 A1 | 6/2004 | Amerga et al. | 455/422.1 |
| 2004/0127220 A1 * | 7/2004 | Proctor | 455/442 |

FOREIGN PATENT DOCUMENTS

WO      03096560      11/2003

OTHER PUBLICATIONS

Scott et al., Diversity Gain From a Single-Port Adaptive Antenna Using Switched Parasitic Elements Illustrated with a Wire and Monopole Prototype, IEEE Transactions on Antennas and Propagation, vol. 47, No. 6, Jun. 1999.

King, The Theory of Linear Antennas, pp. 622-637, Harvard University Press, Cambridge, Mass., 1956.

Lo et al., Antenna Handbook: Theory, Applications and Design, pp. 21-38, Van Nostrand Reinhold Co., New York, 1988.

* cited by examiner

WIRELESS COMMUNICATION METHOD AND APPARATUS FOR SELECTING AND RESELECTING CELLS BASED ON MEASUREMENTS PERFORMED USING DIRECTIONAL BEAMS AND AN OMNI-DIRECTIONAL BEAM PATTERN

CROSS REFERENCE TO RELATED APPLICATION

This application claims the benefit of U.S. Provisional Application No. 60/543,090 filed Feb. 7, 2004, which is incorporated by reference as if fully set forth.

FIELD OF INVENTION

The present invention is related to a wireless multi-cell communication system. More particularly, the present invention is related to a method and apparatus for selecting and reselecting cells by performing measurements on signals received from the cells using directional beams and an omni-directional beam pattern.

BACKGROUND

One of the most important issues associated with wireless communications is how to improve the capacity of wireless multi-cell communication systems that facilitate the communications. One new area being explored is the use of directional beam antennas to improve the link margin of the forward and reverse links between base stations and wireless transmit/receive units (WTRUs). The increased gain of a directional antenna over a conventional omni-directional antenna increases received signal gain at the WTRU and the base station.

When a WTRU is powered on, the WTRU performs an initial cell search procedure, during which the WTRU measures the quality of signals received from a plurality of cells and selects one of the cells having the strongest signal level. For example, in a code division multiple access (CDMA) system, the WTRU acquires a pilot signal from a cell, and then synchronizes to that cell. In order to acquire the pilot signal, the WTRU searches all possibilities of the known pilot code and selects a cell that has the strongest pilot signal. After a cell is selected and as the WTRU moves from one location to another, the WTRU may find a better cell, (i.e., a cell with better quality measurements), to register with. The procedure of re-evaluating the selected cell is called cell re-selection or idle handoff.

A switched beam system is a system where a number of fixed directional beams are defined and a transceiver selects the directional beam that provides the greatest signal quality and the least interference. The use of a directional antenna at a WTRU requires signal level measurements on each of the directional beams in order to select the best directional mode of the antenna. The WTRU must continually monitor the received signal level in each of the directional modes and periodically reselect the best directional mode to accommodate environment changes and movement of the WTRU. The signal level received at the WTRU constantly changes due to multi-path propagation.

In the initial cell selection and cell reselection procedures, the WTRU may take advantage of the switched beam system. In designing cell selection and reselection procedures for a WTRU equipped with a switched beam antenna, there is a trade off between the time spent to perform the selection and reselection procedures and the performance of the selected or reselected cell/beam.

SUMMARY

The present invention is related to a method and apparatus for selecting or reselecting a cell in a wireless communication system based on measurements performed using a plurality of directional beams and/or an omni-directional beam pattern. The system includes a plurality of cells and at least one WTRU. Each of the cells is served by at least one base station. The WTRU includes a switched beam, (i.e., smart), antenna which generates and switches a beam among a plurality of directional beams and an omni-directional beam pattern.

In accordance with a first embodiment of the present invention, the WTRU performs measurements on signals received from a plurality of cells using an omni-directional beam pattern. The WTRU selects the cell having the strongest signal based on the results of the measurements performed on the signals received from the plurality of cells using the omni-directional beam pattern. The WTRU registers with the selected cell and then performs measurements on signals received from the selected cell using each of a plurality of directional beams. The WTRU selects the directional beam having the strongest signal as an active beam for communicating with the selected cell based on the results of the measurements performed on the signals received from the selected cell using each of the plurality of directional beams.

In accordance with a second embodiment of the present invention, the WTRU performs measurements on signals received from a plurality of cells using either a plurality of directional beams or an omni-directional beam pattern. The WTRU selects the cell/beam combination having the strongest signal based on the results of the measurements performed on the signals received from the plurality of cells using either the plurality of directional beams or the omni-directional beam pattern. The WTRU registers with the selected cell using the selected beam as an active beam normally used to communicate with the selected cell.

In accordance with a third embodiment of the present invention, the WTRU performs measurements on signals received from a plurality of cells using an omni-directional beam pattern. The WTRU selects a subset of the cells based on the results of the measurements on the signals received from the plurality of cells using the omni-directional beam pattern. The WTRU then performs measurements on signals received from each of the cells in the subset using each of a plurality of directional beams. The WTRU selects the cell/beam combination having the strongest signal based on the results of the measurements performed on the signals received from each of the cells in the subset using each of the plurality of directional beams. The WTRU registers with the selected cell using the selected beam as an active beam normally used to communicate with the selected cell.

In accordance with a fourth embodiment of the present invention, a WTRU registers with a selected cell and performs measurements on signals received from a plurality of neighboring cells using an active beam normally used to communicate with the selected cell. The WTRU selects a subset of the neighboring cells based on the results of the measurements performed on the signals received from the plurality of neighboring cells using the active beam. The WTRU performs measurements on signals received from the neighboring cells using either a plurality of directional beams or an omni-directional beam pattern. If the WTRU determines that the strongest measurement result of signals received from the neighboring cells in the subset is higher than the best measurement result of signals received from the selected cell, the WTRU initiates a cell handoff from the selected cell to a neighboring cell in the subset having the strongest measurement result.

In accordance with a fifth embodiment of the present invention, a WTRU registers with a selected cell and performs measurements on signals received from a plurality of neighboring cells using an active beam normally used to communicate with the selected cell. The WTRU selects a first subset of the neighboring cells based on the results of the measurements performed on the signals received from the plurality of neighboring cells using the active beam. The WTRU performs measurements on signals received from the neighboring cells in the first subset using an omni-directional beam pattern. The WTRU selects a second subset of the first subset of neighboring cells based on the results of the measurements performed on the signals received from the plurality of neighboring cells in the first subset. The WTRU performs measurements on signals received from the neighboring cells in the second subset using each of a plurality of directional beams. If the WTRU determines that the strongest measurement result of signals received from the neighboring cells in the second subset is higher than the best measurement result of signals received from the selected cell, the WTRU initiates a cell handoff from the selected cell to a neighboring cell in the second subset having the strongest measurement result.

In accordance with a sixth embodiment of the present invention, a WTRU registers with a selected cell and performs measurements on signals received from a plurality of neighboring cells using an omni-directional beam pattern. The WTRU selects a subset of the neighboring cells based on the results of the measurements performed on the signals received from the plurality of neighboring cells using the omni-directional beam pattern. The WTRU performs measurements on signals received from each of the neighboring cells in the subset using a plurality of directional beams. If the WTRU determines that the strongest measurement result of signals received from the neighboring cells in the subset is higher than the best measurement result of signals received from the selected cell, the WTRU initiates a cell handoff from the selected cell to a neighboring cell in the subset having the strongest measurement result.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "base station" includes but is not limited to a Node-B, a site controller, an access point (AP) or any other type of interfacing device in a wireless environment.

The features of the present invention may be incorporated into an integrated circuit (IC) or be configured in a circuit comprising a multitude of interconnecting components.

Figure 1:
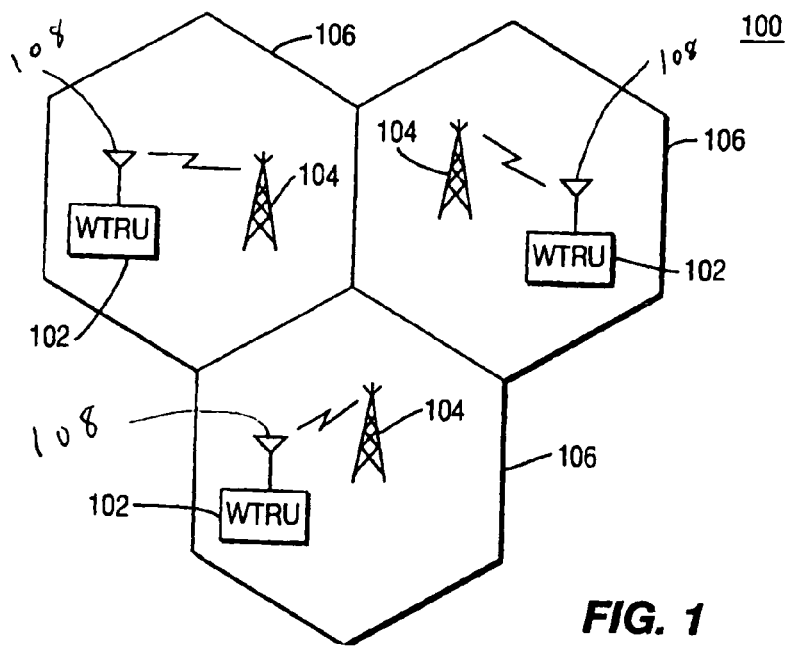
FIG. 1 shows a wireless communication system which operates in accordance with the present invention.

FIG. 1 shows a wireless communication system 100 which operates in accordance with the present invention. The wireless communication system 100 includes a plurality of base stations 104 and a plurality of WTRUs 102. Each of the base stations 104 serves at least one of a plurality of cells 106. Each of the WTRUs 102 is registered with at least one of the cells 106 and includes a switched beam antenna 108 which is used to generate either a plurality of directional beams or an omni-directional beam pattern. The WTRU 102 switches a beam among the plurality of directional beams and the omni-directional beam pattern to communicate with the base station 104 of the cell 106.

When the WTRU 102 is turned on, an initial cell search procedure is initiated. During the initial cell search procedure, the WTRU 102 receives signals from a plurality of cells 106 near the WTRU 102, and selects one cell 106 in accordance with predetermined criteria. The WTRU 102 utilizes either the omni-directional beam pattern or a directional beam during the initial cell search procedure using the switched beam antenna 108. Once the WTRU 102 is registered with the cell 106 is selected, the WTRU 102 periodically monitors signals from neighboring cells and performs a cell hand-off through a cell reselection procedure.

Figure 2:
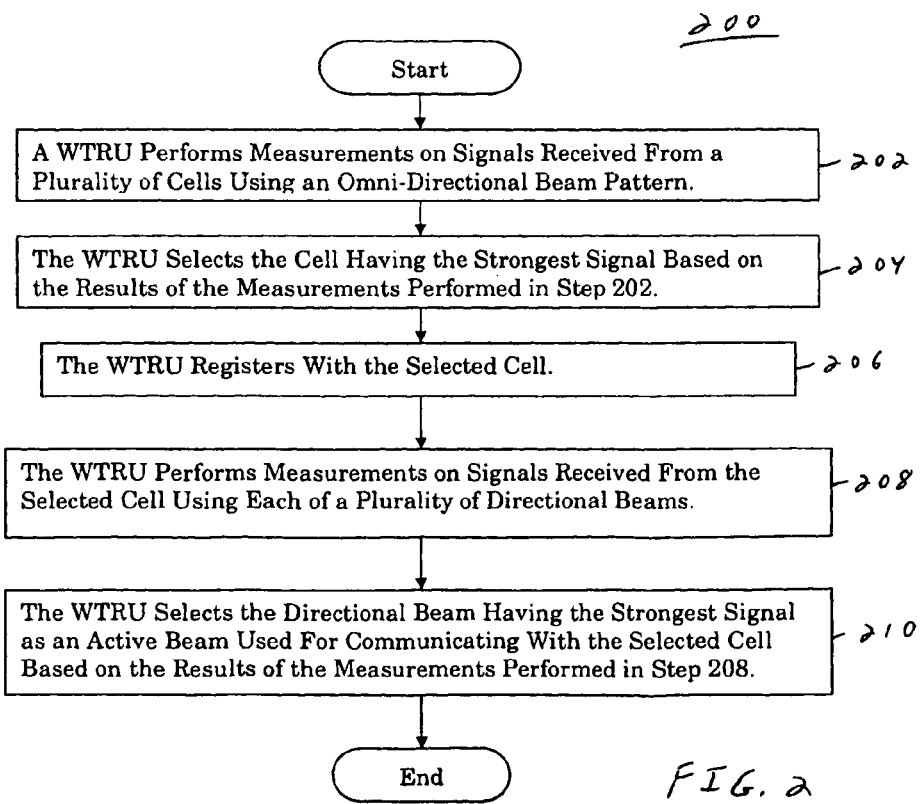
FIGS. 2-4 are flow diagrams of processes including method steps implemented by a WTRU included in the system of FIG. 1 for selecting a cell to register with and selecting a beam used to communicate with the selected cell.

FIG. 2 is a flow diagram of a process 200 including method steps for selecting a cell 106 using the switched beam antenna 108 of the WTRU 102 in accordance with a first embodiment of the present invention. When the WTRU 102 is turned on, the WTRU 102 enters a default mode whereby an omni-directional beam pattern is radiated from the antenna 108 of the WTRU 102. In step 202, the WTRU 102 performs measurements on signals received from a plurality of cells 106 using the omni-directional beam pattern. In step 204, the WTRU 102 selects the cell 106 having the strongest signal based on the results of the measurements performed in step 202. In step 206, the WTRU registers with the selected cell 106 (step 206). The advantage of the first embodiment is that the cell selection procedure may be quickly implemented.

Once the WTRU 102 is registered with the selected cell 106, a beam selection procedure is performed. The best beam is chosen by evaluating all of the defined beams, (or alternatively, a subset of the defined beams), and determining the best beam to be used by the antenna 108 of the WTRU 102 for transmission and reception. The beam selection procedure may be performed either immediately after the cell selection of step 204, or after the registration step 206 in which the WTRU 102 is assigned to a dedicated channel provided by the selected cell 106 for communication with the base station 104 of the selected cell 106. In either case, the WTRU 102 performs measurements on signals received from the selected cell 106 while switching the beam radiated from the antenna 108 to each of a plurality of directional beams (step 208). The WTRU 102 then selects the directional beam having the strongest signal as an active beam for communicating with the selected cell 106 based on the results of the measurements performed in step 208 (step 210). The WTRU 102 maintains the registration with the selected cell 106 until another cell 106 is selected through a cell reselection procedure which will be explained in detail while referring to FIGS. 5-7.

Figure 3:
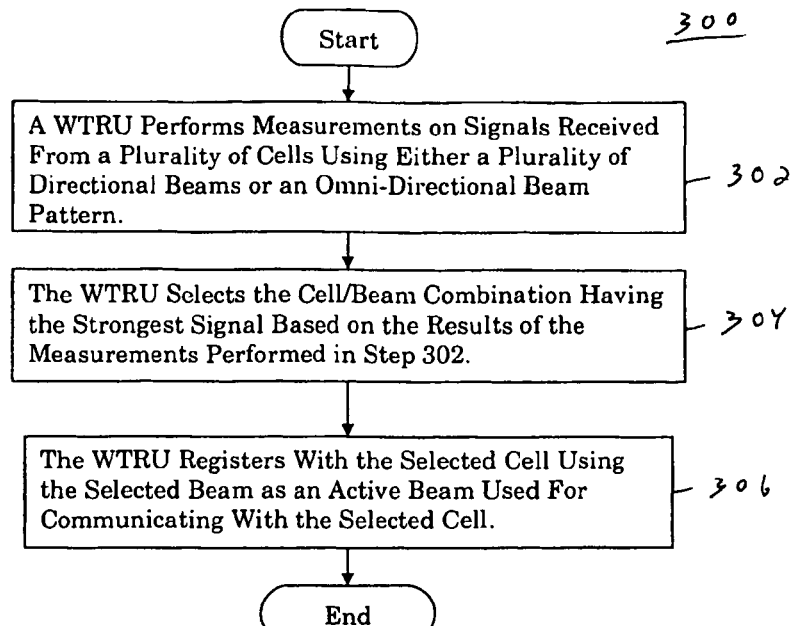

FIG. 3 is a flow diagram of a process 300 including method steps for selecting a cell 106 using the switched beam antenna 108 of the WTRU 102 in accordance with a second embodiment of the present invention. When the WTRU 102 is turned on, the WTRU 102 performs measurements on signals received from a plurality of cells 106 by switching the beam radiated from the antenna 108 either to each of a plurality of directional beams or to an omni-directional beam pattern (step 302). In this embodiment, the WTRU 102 selects not only a cell 106 to register with, but also a beam to use as an active beam to communicate with the selected cell. In step 304, the WTRU 102 selects the cell/beam combination having the strongest signal based on the results of the measurements performed in step 302. In step 306, the WTRU 102 registers with the selected cell 106 using the selected beam as an active beam normally used to communicate with the selected cell. The WTRU 102 maintains the registration with the current cell 106 until another cell 106 is selected through a cell reselection procedure.

In process 300, a preference of using the omni-directional beam pattern to implement the initial cell search procedure may be designated whereby, if the selected beam is not an omni-directional beam pattern, then the measurement result which indicates the best directional beam/cell combination is compared with the measurement result which indicates the best omni-directional beam pattern/cell combination. Thus, a directional beam is selected only if the measurement result associated with the directional beam exceeds the measurement result associated with the omni-directional beam pattern by a predetermined threshold. Otherwise, the omni-directional beam pattern is selected. The threshold may be set to zero, in which case the onmi-directional beam pattern does not have preference.

Figure 4:
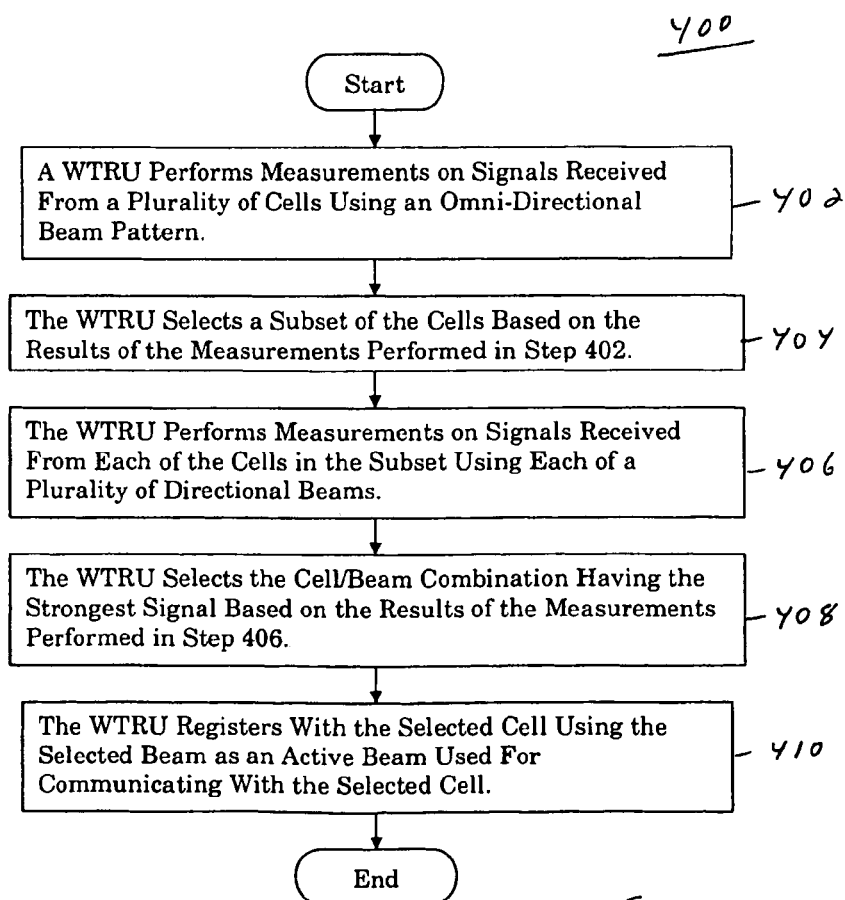

FIG. 4 is a flow diagram of a process 400 including method steps for selecting a cell using the switched beam antenna 108 of the WTRU 102 in accordance with a third embodiment of the present invention. When the WTRU 102 is turned on, the WTRU 102 uses an omni-directional beam pattern radiated from the antenna 108 of the WTRU 102 to perform measurements on signals received from a plurality of cells 106 (step 402). The WTRU 102 then selects a subset of the cells based on the results of the measurements performed in step 402 (step 404). In selecting the subset of cells, the WTRU 102 may select the best cells based on the measurement results using the omni-directional beam pattern, cells having a measurement result above a predetermined threshold, or using some other criteria to reduce the number of cells that need to be measured. This reduces the time spent in the cell selection or reselection procedure.

The WTRU 102 performs measurements on signals received from each of the cells in the subset using each of a plurality of directional beams radiated from the antenna 108 of the WTRU 102 (step 406). The WTRU 102 selects the cell/beam combination having the strongest signal based on the results of the measurements performed in step 406 (step 408). The WTRU 102 registers with the selected cell 106 using the selected beam as an active beam to communicate with the selected cell (step 410). The WTRU 102 maintains the registration with the current cell 106 until another cell 106 is selected through a cell reselection procedure.

In the process 400, a preference of using the omni-directional beam pattern to implement the initial cell search procedure may be designated whereby, if the selected beam is not an omni-directional beam pattern, then the measurement result which indicates the best directional beam/cell combination is compared with the measurement result which indicates the best omni-directional beam pattern/cell combination. Thus, a directional beam is selected only if the measurement result associated with the directional beam exceeds the measurement result associated with the omni-directional beam pattern by a predetermined threshold. Otherwise, the omni-directional beam pattern is selected. The threshold may be set to zero, in which case the omni-directional beam pattern does not have preference.

Figure 5:
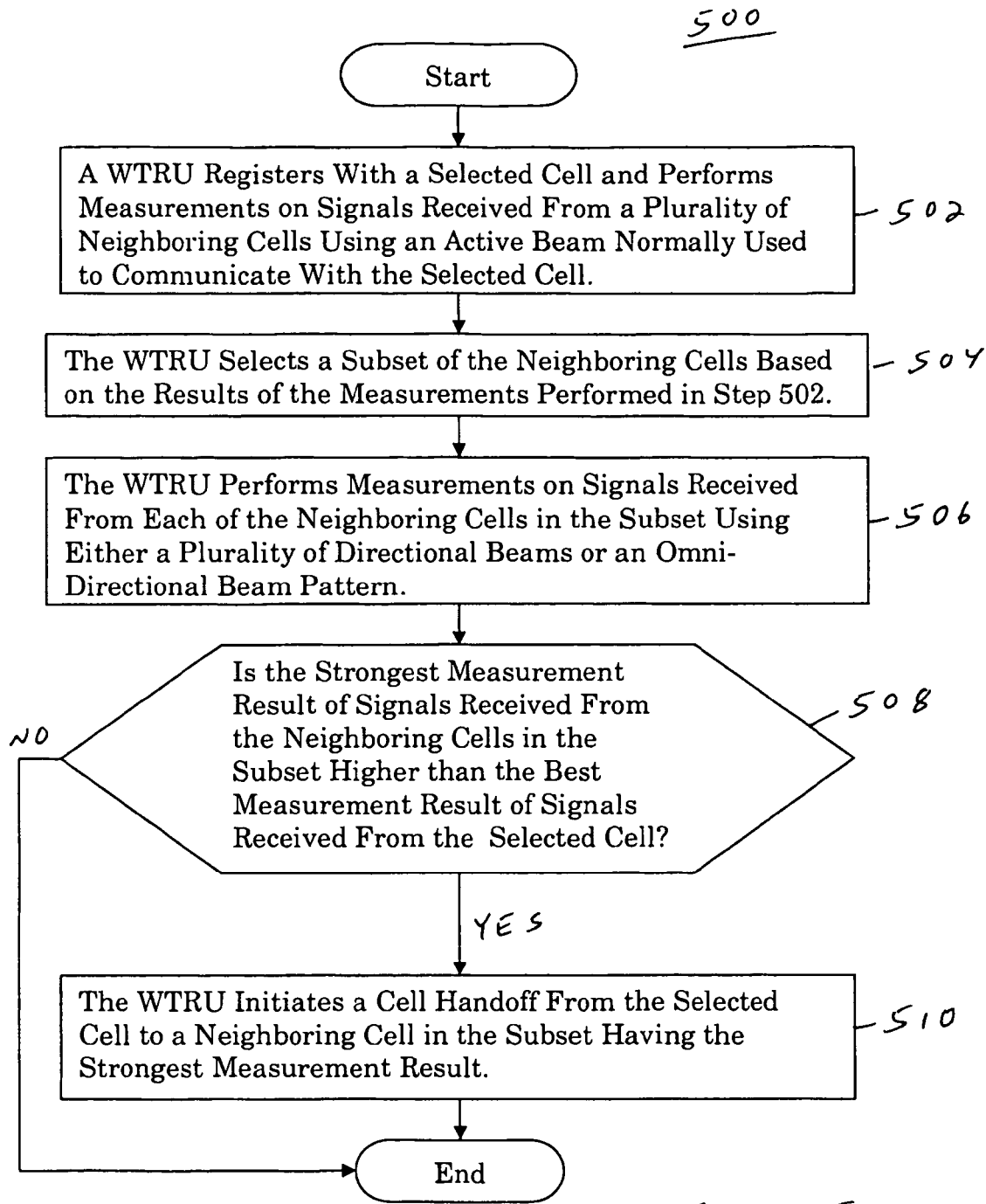
FIGS. 5-7 are flow diagrams of processes including method steps implemented by a WTRU included in the system of FIG. 1 for reselecting a cell.

FIG. 5 is a flow diagram of a process 500 including method steps for reselecting a cell 106 using the switched beam antenna 108 of the WTRU 102 in accordance with a fourth embodiment of the present invention. After an initial cell search procedure is completed and the WTRU 102 is registered with a selected cell 106, the WTRU 102, periodically or non-periodically, performs measurements on signals received from a plurality of neighboring cells using an active beam normally used to communicate with the selected cell 106 (step 502). The WTRU 102 selects a subset of the neighboring cells based on the results of measurements performed in step 502 (step 504). When selecting the subset of neighboring cells, the WTRU 102 may select the best cells based on, for example, their measurement results, cells having a measurement result above a predetermined threshold, or cells having a measurement result which exceeds a selected cell measurement by a predetermined threshold. Optionally, the subset of cells may include all of the measured cells.

The WTRU 102 performs measurements on signals received from each of the neighboring cells in the subset using either a plurality of directional beams or an omni-directional beam pattern radiated from the antenna 108 of the WTRU 102 (step 506). The WTRU 102 then determines whether the strongest measurement result of signals received from the neighboring cells in the subset is higher, (by some threshold, which can be set to zero), than the best measurement result of signals received from the selected cell 106 (step 508). If the determination at step 508 is negative, the WTRU 102 maintains its registration with the selected cell 106 and the process 500 ends. If the determination at step 508 is positive, the WTRU 102 initiates a cell handoff, (i.e., performs a cell reselection process), from the selected cell to a neighboring cell in the subset having the strongest measurement result (step 510).

Figure 6:
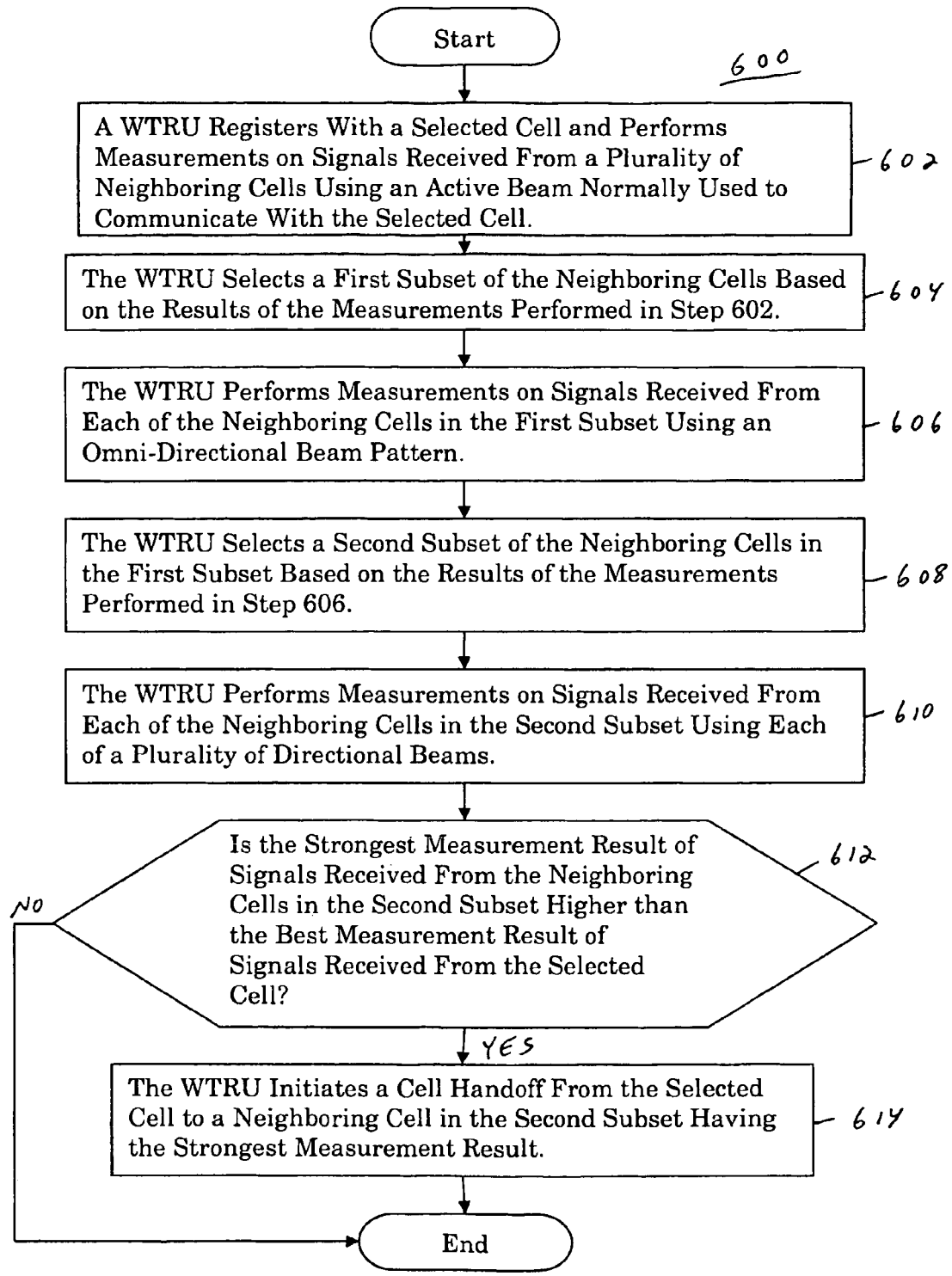

FIG. 6 is a flow diagram of a process 600 including method steps for reselecting a cell 106 using the switched beam antenna 108 of the WTRU 102 in accordance with a fifth embodiment of the present invention. After an initial cell search procedure is completed and the WTRU 102 is registered with a selected cell 106, the WTRU 102, periodically or non-periodically, performs measurements on signals received from a plurality of neighboring cells using an active beam normally used to communicate with the selected cell 106 (step 602). The WTRU 102 selects a first subset of the neighboring cells based on the results of measurements performed in step 602 (step 604). When selecting the first subset of the neighboring cells, the WTRU 102 may select the best cells based on, for example, their measurement results, cells having a measurement result above a predetermined threshold, or cells having a measurement result which exceeds a selected cell measurement by a predetermined threshold. Optionally, the first subset of cells may include all of the measured cells.

The WTRU 102 performs measurements on signals received from the neighboring cells in the first subset using an omni-directional beam pattern radiated from the antenna 108 of the WTRU 102 (step 606). The WTRU 102 then selects a second subset of the first subset of neighboring cells based on the results of the measurements performed in step 606 (step 608). In selecting the second subset of neighboring cells, the WTRU 102 may select the best cells based on, for example, their measurement results, cells having a measurement result above a predetermined threshold, or cells having a measurement result which exceeds a selected cell measurement by a predetermined threshold. Optionally, the subset may include all of the cells that belong to the first subset.

The WTRU 102 performs measurements on signals received from the neighboring cells in the second subset using each of a plurality of directional beams radiated from the antenna 108 of the WTRU 102 (step 610). The WTRU 102 then determines whether the strongest measurement result of signals received from the neighboring cells in the second subset is higher, (by some threshold, which can be set to zero), than the best measurement result of signals received from the selected cell 106 (step 612). If the determination at step 612 is negative, the WTRU 102 maintains its registration with the selected cell 106 and the process 600 ends. If the determination at step 612 is positive, the WTRU 102 initiates a cell handoff, (i.e., performs a cell reselection process), from the selected cell to a neighboring cell in the second subset having the strongest measurement result (step 614).

Figure 7:
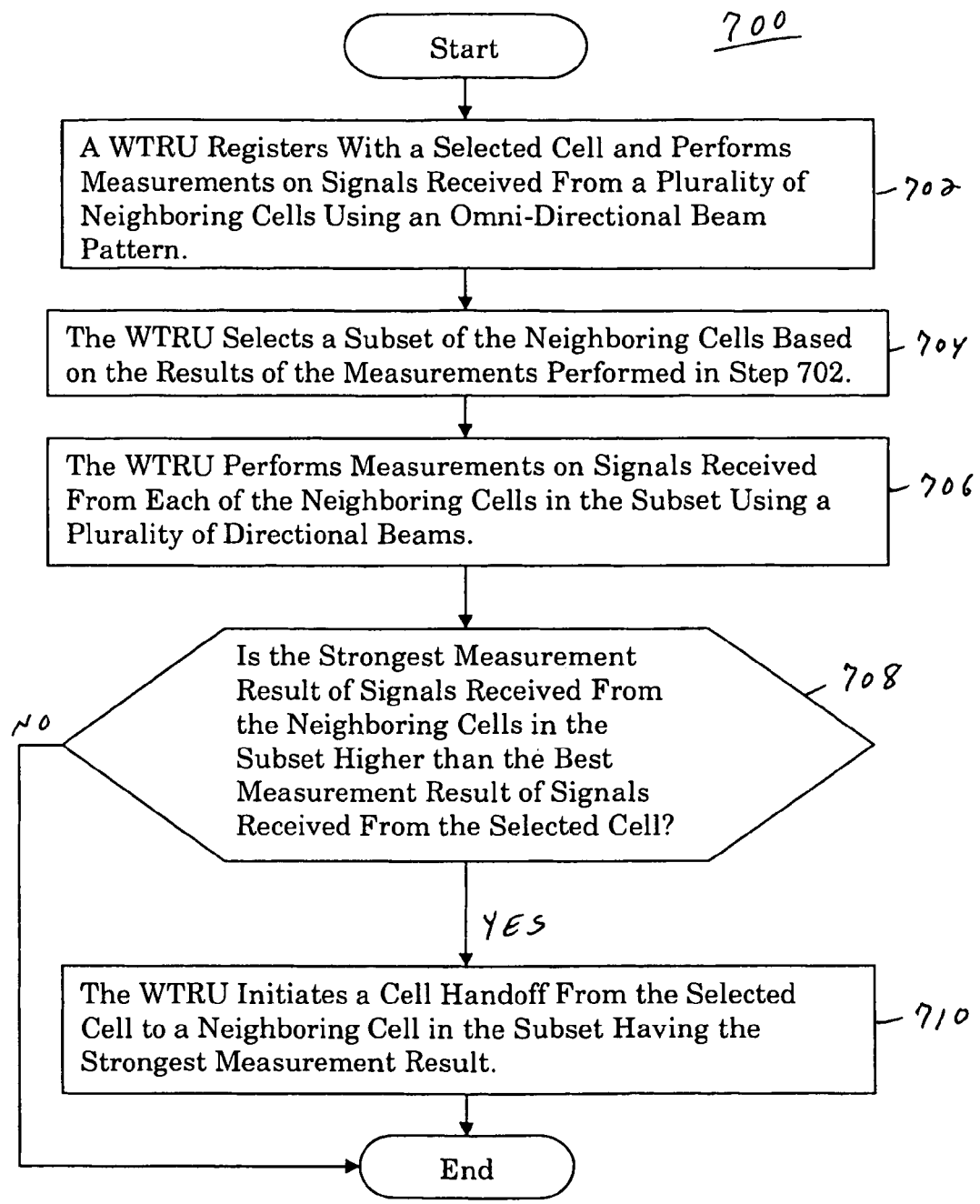

FIG. 7 is a flow diagram of a process 700 including method steps for reselecting a cell 106 using the switched beam antenna 108 of the WTRU 102 in accordance with a sixth embodiment of the present invention. After an initial cell search procedure is completed and the WTRU 102 is registered with a selected cell 106, the WTRU 102, periodically or non-periodically, measures signals received from a plurality of neighboring cells using an omni-directional beam pattern radiated from the antenna 108 of the WTRU 102 (step 702). The WTRU 102 selects a subset of the neighboring cells based on the results of the measurements performed in step 702 (step 704). In selecting the subset of neighboring cells, the WTRU 102 may select the best cells based on, for example, their measurement results, cells having a measurement result above a predetermined threshold, or cells having a measurement result which exceeds a selected cell measurement by a predetermined threshold. Optionally, the first subset of cells may include all of the measured cells.

The WTRU 102 performs measurements on signals received from each of the neighboring cells in the subset using a plurality of directional beams radiated from the antenna 108 of the WTRU 102 (step 706). The WTRU 102 then determines whether the strongest measurement result of signals received from the neighboring cells in the subset is higher, (by some threshold, which can be set to zero), than the best measurement result of signals received from the selected cell (step 708). If the determination at step 708 is negative, the WTRU 102 maintains its registration with the selected cell and the process 700 ends. If the determination at step 708 is positive, the WTRU 102 initiates a cell handoff, (i.e., performs a cell reselection process), from the selected cell to the neighboring cell in the subset having the strongest measurement result (step 710).

Figure 8:
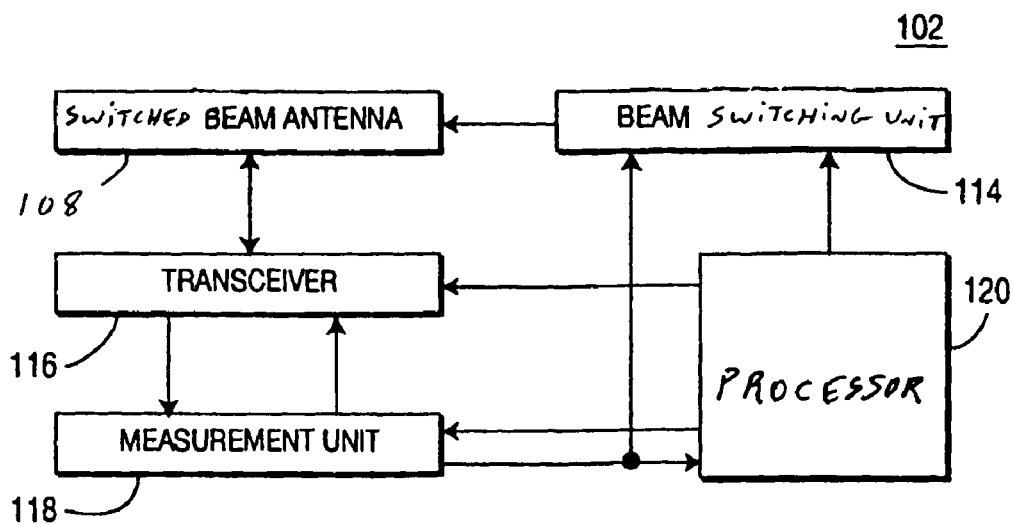
FIG. 8 is a block diagram of a WTRU included in the system of FIG. 1.

FIG. 8 is a block diagram of the WTRU 102 configured to select and reselect a cell using a switched beam antenna in accordance with the present invention. The WTRU 102 comprises a switched beam antenna 112, a beam switching unit 114, a transceiver 116, a measurement unit 118 and a processor 120. The switched beam antenna 112 comprises a plurality of antenna elements used to selectively generate a plurality of directional beams and an omni-directional beam pattern.

Figure 9:
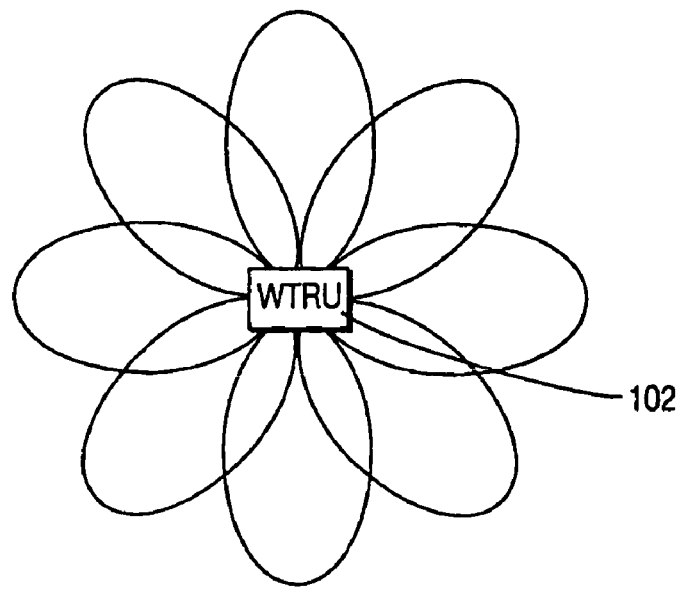
FIG. 9 shows an example of a directional beam pattern produced by the WTRU of FIG. 8.

FIG. 9 is an exemplary directional beam pattern generated by the switched beam antenna 112 of the WTRU 102, as shown in FIG. 8. It should be noted that eight (8) beams are illustrated in FIG. 9, and any number of beams may be generated. Thus, the present invention should not be construed to be limited to any particular number of beams.

The beam switching unit 114 is for switching a beam to one of the plurality of directional beams and between one of the directional beams and the omni-directional beam pattern. The transceiver 116 receives signals from the switched beam antenna 112 and feeds them to the measurement unit 118. The measurement unit 118 is part of a baseband processing unit used to measure the quality of signals received from the switched beam antenna 112. The processor 120 controls the beam switching unit 114, the transceiver 116 and the measurement unit 118, and implements the processes 200-700 described above, as shown in FIGS. 2-7, respectively.

It should be noted that the present invention is not limited to a two dimensional planar space, and may be applicable to three-dimensional planar space.

Although the features and elements of the present invention are described in the preferred embodiments in particular combinations, each feature or element can be used alone without the other features and elements of the preferred embodiments or in various combinations with or without other features and elements of the present invention.

While the present invention has been described in terms of the preferred embodiment, other variations which are within the scope of the invention as outlined in the claims below will be apparent to those skilled in the art.

What is claimed is:

1. In a wireless communication system including at least one wireless transmit/receive unit (WTRU) and a plurality of cells, the WTRU being configured to include a switched beam antenna for generating a plurality of directional beams and an omni-directional beam pattern, a cell selection method comprising:
    (a) the WTRU performing measurements on signals received from the cells using the directional beams and the omni-directional beam pattern;
    (b) the WTRU selecting a cell/beam combination having the strongest signal based on the results of the measurements performed in step (a); and
    (c) the WTRU registering with the selected cell using the selected beam as an active beam used for communicating with the selected cell.

2. The method of claim 1 further comprising:
    (d) if the selected beam is not an omni-directional beam pattern, comparing a measurement result which indicates the best directional beam/cell combination with the measurement result which indicates the best omni-directional beam pattern/cell combination.

3. The method of claim 2 wherein a directional beam is selected if the measurement result associated with the directional beam exceeds the measurement result associated with the omni-directional beam pattern by a predetermined threshold, and the omni-directional beam pattern is selected when the measurement result associated with the directional beam does not exceed the measurement result associated with the omni-directional beam pattern.

4. In a wireless communication system including at least one wireless transmit/receive unit (WTRU) and a plurality of cells, the WTRU being configured to include a switched beam antenna for generating a plurality of directional beams and an omni-directional beam pattern, a cell selection method comprising:
   (a) the WTRU performing measurements on signals received from the cells using the omni-directional beam pattern;
   (b) the WTRU selecting a subset of the cells based on the results of the measurements performed in step (a);
   (c) the WTRU performing measurements on signals received from the subset of cells using each of the directional beams;
   (d) the WTRU selecting a cell/beam combination having the strongest signal based on the results of the measurements performed in step (c); and
   (e) the WTRU registering with the selected cell using the selected beam as an active beam used for communicating with the selected cell.

5. In a wireless communication system including a plurality of cells, a wireless transmit/receive unit (WTRU) comprising:
   (a) a switched beam antenna for generating a plurality of directional beams and an omni-directional beam pattern;
   (b) means for performing measurements on signals received from the cells using the directional beams and the omni-directional beam pattern;
   (c) means for selecting a cell/beam combination having the strongest signal based on the results of the measurements performed using either the directional beams or the omni-directional beam pattern; and
   (d) means for registering with the selected cell using the selected beam as an active beam used for communicating with the selected cell.

6. The WTRU of claim 5 further comprising:
   (e) means for comparing a measurement result which indicates the best directional beam/cell combination with the measurement result which indicates the best omni-directional beam pattern/cell combination, if the selected beam is not an omni-directional beam pattern.

7. The WTRU of claim 6 wherein a directional beam is selected if the measurement result associated with the directional beam exceeds the measurement result associated with the omni-directional beam pattern by a predetermined threshold, and the omni-directional beam pattern is selected when the measurement result associated with the directional beam does not exceed the measurement result associated with the omni-directional beam pattern.

8. In a wireless communication system including a plurality of cells, a wireless transmit/receive unit (WTRU) comprising:
   (a) a switched beam antenna for generating a plurality of directional beams and an omni-directional beam pattern;
   (b) means for performing measurements on signals received from the cells using the omni-directional beam pattern;
   (c) means for selecting a subset of the cells based on the results of the measurements using the omni-directional beam pattern;
   (d) means for performing measurements on signals received from the subset of cells using each of the directional beams;
   (e) means for selecting a cell/beam combination having the strongest signal based on the results of the measurements performed using each of the directional beams; and
   (f) means for registering with the selected cell using the selected beam as an active beam used for communicating with the selected cell.

9. In a wireless communication system including a plurality of cells, an integrated circuit (IC) operating in conjunction with a switched beam antenna for generating a plurality of directional beams and an omni-directional beam pattern, the IC comprising:
   (a) means for performing measurements on signals received from the cells using the directional beams and the omni-directional beam pattern;
   (b) means for selecting a cell/beam combination having the strongest signal based on the results of the measurements performed using either the directional beams or the omni-directional beam pattern; and
   (c) means for registering with the selected cell using the selected beam as an active beam used for communicating with the selected cell.

10. The IC of claim 9 further comprising:
    (d) means for comparing a measurement result which indicates the best directional beam/cell combination with the measurement result which indicates the best omni-directional beam pattern/cell combination, if the selected beam is not an omni-directional beam pattern.

11. The IC of claim 10 wherein a directional beam is selected if the measurement result associated with the directional beam exceeds the measurement result associated with the omni-directional beam pattern by a predetermined threshold, and the omni-directional beam pattern is selected when the measurement result associated with the directional beam does not exceed the measurement result associated with the omni-directional beam pattern.

12. In a wireless communication system including a plurality of cells, an integrated circuit (IC) operating in conjunction with a switched beam antenna for generating a plurality of directional beams and an omni-directional beam pattern, the IC comprising:
    (a) means for performing measurements on signals received from the cells using the omni-directional beam pattern;
    (b) means for selecting a subset of the cells based on the results of the measurements using the omni-directional beam pattern;
    (c) means for performing measurements on signals received from the subset of cells using each of the directional beams;
    (d) means for selecting a cell/beam combination having the strongest signal based on the results of the measurements performed using each of the directional beams; and
    (e) means for registering with the selected cell using the selected beam as an active beam used for communicating with the selected cell.

13. In a wireless communication system including at least one wireless transmit/receive unit (WTRU) and a plurality of cells, the WTRU being configured to include a switched beam antenna for generating a plurality of directional beams and an omni-directional beam pattern, a cell selection method comprising:
    (a) the WTRU performing measurements on signals received from the cells using the directional beams;
    (b) the WTRU selecting a cell/beam combination having the strongest signal based on the results of the measurements performed in step (a); and (c) the WTRU registering with the selected cell using the selected beam as an active beam used for communicating with the selected cell.

14. In a wireless communication system including a plurality of cells, a wireless transmit/receive unit (WTRU) comprising:
- (a) a switched beam antenna for generating a plurality of directional beams and an omni-directional beam pattern;
- (b) means for performing measurements on signals received from the cells using the directional beams;
- (c) means for selecting a cell/beam combination having the strongest signal based on the results of the measurements performed using either directional beams; and
- (d) means for registering with the selected cell using the selected beam as an active beam used for communicating with the selected cell.

* * * * *